(12) United States Patent
Ashok et al.

(10) Patent No.: US 11,610,192 B2
(45) Date of Patent: Mar. 21, 2023

(54) GRAPHICAL USER INTERFACE LANGUAGE LOCALIZATION

(71) Applicant: PayPal, Inc., San Jose, CA (US)

(72) Inventors: Aarti Ashok, Cupertino, CA (US); Michael George McKenna, Oakland, CA (US); Girish Maheswarappa Halavarthi, Fremont, CA (US); Joelle Cheng, Singapore (SG); Sine Rix, San Jose, CA (US); Sung-Yan Lu, Palo Alto, CA (US); Gulrez Khan, San Jose, CA (US); Lucas Welti, Campbell, CA (US)

(73) Assignee: PayPal, Inc., San Jose, CA (US)

( * ) Notice: Subject to any disclaimer, the term of this patent is extended or adjusted under 35 U.S.C. 154(b) by 153 days.

(21) Appl. No.: 17/027,107

(22) Filed: Sep. 21, 2020

(65) Prior Publication Data
US 2022/0092578 A1    Mar. 24, 2022

(51) Int. Cl.
G06Q 20/32     (2012.01)
G06F 9/445     (2018.01)
(Continued)

(52) U.S. Cl.
CPC ....... G06Q 20/3265 (2020.05); G06F 9/4451 (2013.01); G06F 16/9535 (2019.01); G06F 40/58 (2020.01); G06Q 50/01 (2013.01)

(58) Field of Classification Search
CPC .. G06Q 20/3265; G06Q 50/01; G06F 9/4451; G06F 16/9535; G06F 40/58
See application file for complete search history.

(56) References Cited

U.S. PATENT DOCUMENTS 8,645,389 B2 *   2/2014  Oliver ................... G06F 16/285
                                              707/723
2013/0268260 A1 * 10/2013 Lundberg ............ G06F 11/3664
                                              704/8
(Continued)

FOREIGN PATENT DOCUMENTS

KR        102214562 B1 *  6/2020  ............. G10L 15/18

OTHER PUBLICATIONS

Hermann Moisl. Hierarchical Cluster Analysis of Nonlinear Linguistic Data. Corpus Linguistics, 2013, pp. 208-213. (Year: 2013).*
(Continued)

Primary Examiner — Virpi H Kanervo
(74) Attorney, Agent, or Firm — Haynes and Boone, LLP

(57) ABSTRACT

Systems and methods for predicting language dialects for a user to improve a user interface of an application are disclosed. In one embodiment, a system receives a request to determine a default dialect for an application executing on a user device. The system acquires user information corresponding to a user of the user device. Based on the user information and using a clustering algorithm, the system assigns the user to a cluster associated with a dialect. The system provides the dialect to the user device for display in a user interface as part of a sliding scale of selectable dialects of the application such that the dialect is provided as the default dialect for text and other message communications in the application. The system learns from the user's choice of dialect to provide more accurate dialect predictions in the future for other users.

20 Claims, 10 Drawing Sheets

(51) Int. Cl.
  *G06Q 50/00* (2012.01)
  *G06F 40/58* (2020.01)
  *G06F 16/9535* (2019.01)

(56) References Cited

U.S. PATENT DOCUMENTS

| | | | |
|---|---|---|---|
| 2014/0215330 A1* | 7/2014 | Lee | G06F 9/454 |
| | | | 715/703 |
| 2014/0335483 A1* | 11/2014 | Buryak | G09B 5/08 |
| | | | 434/167 |
| 2015/0100537 A1* | 4/2015 | Grieves | G06N 5/04 |
| | | | 706/52 |
| 2015/0161114 A1* | 6/2015 | Buryak | G06F 40/58 |
| | | | 704/8 |
| 2016/0293159 A1* | 10/2016 | Belisario | G10L 15/28 |
| 2019/0180270 A1* | 6/2019 | Ericson | G06Q 20/4014 |
| 2020/0104337 A1* | 4/2020 | Kelly | H04L 51/32 |
| 2021/0405977 A1* | 12/2021 | Baafi | G06F 3/0486 |

OTHER PUBLICATIONS

Jochen L. Leidner and Michael D. Lieberman. Detecting Geographical References in the Form of Place names and Associated Spatial Natural Language. Sigspatial Special. vol. 3, Issue 2, pp. 5-11. (Jul. 2011). (Year: 2011).*

* cited by examiner

501

Example1: Language: Hindi
* Dialect1 (Extremely informal): emoji + Hindi + English
Sample text: अपने  से payment करें
Translation: pay with your mobile (emoji for mobile and payment in English script)
* Dialect2 (Extremely informal): Hindi + English (In English script)
Sample text: अपने mobile से payment करें
Translation: pay with your mobile (mobile and payment in English)
* Dialect3 (Informal Hinglish): Hindi + English (in Hindi script)
Sample text: अपने मोबाइल से पैमेंट करें
Translation: pay with your mobile (mobile and payment in English language but Hindi script)
* Dialect4 (Pure formal Hindi)
Sample text: अपने मोबाइल से भुगतान करें
Translation: pay with your mobile (everything is completely in Hindi)

Example2: Language: Spanish
Dialect1 (Extremely informal)
Sample text: No pasa nada, tranquilo, esto se arregla en un santiamén.
Translation: No worries, cool down, this can be fixed in a snap
* Dialect2 (neutral)
Sample text: Lo sentimos, pero no te preocupes -- normalmente es rápido y fácil solucionarlo.
Translation: We're sorry, but don't worry. Generally it's easy and quick to fix this.
* Dialect3(Extremely formal)
Sample text: Lamentamos los inconvenientes que le hayamos podido ocasionar. No se preocupe, intentaremos resolverlo a la mayor brevedad.
Translation: We regret the inconvenience. Don't worry, we will address this shortly

Fig. 5B

GRAPHICAL USER INTERFACE LANGUAGE LOCALIZATION

TECHNICAL FIELD

The present disclosure generally relates to graphical user interfaces and more particularly to language content provided on graphical user interfaces based on localization data according to various embodiments.

BACKGROUND

Application localization is the process of changing and refining an application in order to appeal to a target market such as a geographically specific market. Oftentimes, user interfaces of applications present language barriers to users, which may have an unintended preclusive effect. For example, users of an application may become frustrated by the application's user interface when the language dialect of the application is confusing or not understandable. As device applications become more pervasive in different parts of the world with the expansion of technology, the language dialects necessary to reach the wider audience will need to evolve. Thus, there is a need in the art for an improved application user interface that is user-friendly and evolves with the users of the application.

BRIEF DESCRIPTION OF THE FIGURES

FIG. 5B illustrates examples of languages and language dialect options for a user to choose from when setting the language and language dialect for a user interface in accordance with one or more embodiments of the present disclosure.

Figure 1:
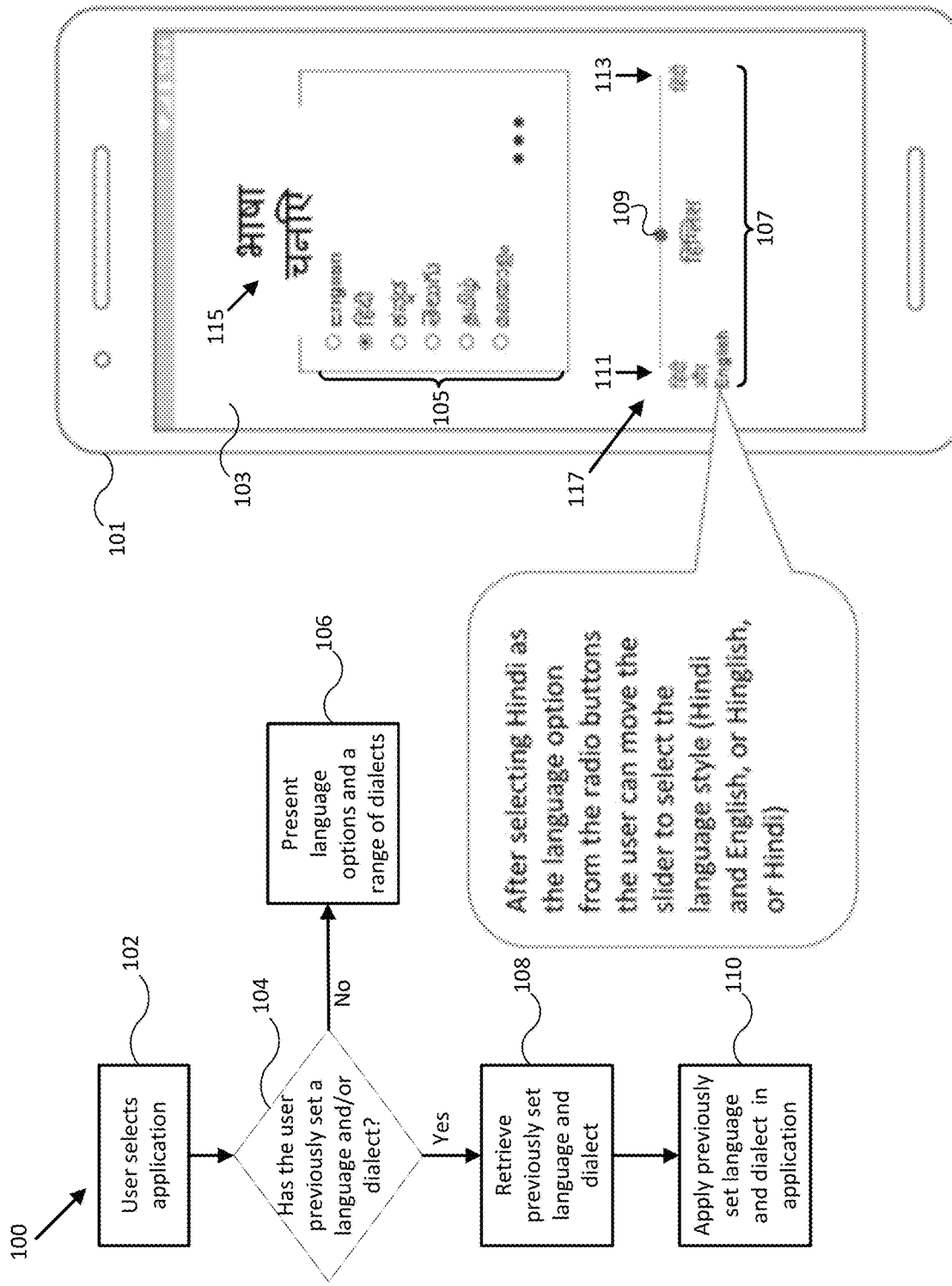
FIG. 1 illustrates is a flow diagram of a process for setting a language and/or language dialect for a user interface in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Technology is used for most of the activities people do every day such as communicating with others, finding information, publishing and reading, watching videos, listening to music, selling and buying goods and services, going to school, and so forth. Technology should be designed so that user interfaces are easily understandable and people feel capable and comfortable navigating the user interfaces and using the associated technological device. The present disclosure describes systems and methods that improve graphical user interfaces (GUIs) by allowing text and message communications in user interfaces to be tailored to the user's preference in language and language dialect. By creating a user interface that implements a language dialect variation that a user trusts and understands, the user will have a user experience that brings the look, feel, and comfort of the real-world to the user interface.

In one embodiment, a dialect service system may receive a request (directly or indirectly) to determine a default dialect for an application executing on a user device. The request may be received when no default dialect has been determined. The request may also be received when a default dialect has been determined, in which case, the dialect service system may either reinforce the default dialect or change the default dialect. In either case, either a positive feedback or a negative feedback can be used to improve determining dialects in subsequent use cases. The system may acquire user information related to the user of the user device such as a device type, a network provider, device geocoordinates, a language-accept list, a referring URL, a gender, payment transaction history, and social network information. The user information may be anonymized and used to create hash buckets of demographic and socioeconomic facets of the user. Based on the hash buckets, the system may use a clustering algorithm to assign the user to a cluster mapped to a particular language dialect. The clustering algorithm statistically identifies the closest overlap between the user's hash buckets and other users' hash buckets to assign the user to the appropriate cluster. The system may provide the language dialect to the user device for display in a language select screen as a default choice in a sliding scale of selectable language dialects corresponding to a language. The user may have the opportunity to select a language and the preferred dialect of the language in the language select screen. Once a language and language dialect are chosen by the user, the user interface may implement the chosen language dialect for the text and message communications in the user interface.

In some embodiments, the dialect service system may receive a user selection of one of the selectable language dialects and record the user selection of the language dialect along with a hash map of user information as feedback for the clustering algorithm. In this way, the clustering algorithm may learn from users as they make language dialect selections. For example, if the clustering algorithm assigns the user to a cluster associated with a formal language dialect but the user ends up choosing an informal language dialect, the clustering algorithm may update to learn that other users with similar demographic and socioeconomic backgrounds may also want to choose the informal language dialect. As more feedback is received by the system, the system may be able to more accurately predict what language and language dialect a user prefers by evaluating his/her demographic and socioeconomic background against other users.

In some cases, the dialect service system may generate new language dialects. For example, when the user does not select the default language dialect, the system may monitor the user's activity within the application to generate a new language dialect more suitable for the user. In one embodiment, the new language dialect may be generated based on observations of the user's interactions with other users (e.g., messages exchanged between users). The new language dialect may be integrated into the clustering algorithm such that other users with similar backgrounds may have the new dialect language presented as a default dialect language or otherwise made available as an option to choose from in a language select screen.

Referring now to FIG. 1, illustrated is a flow diagram of a process 100 for setting a language and/or language dialect for a user interface 103 of an application installed on a user device 101 in accordance with one or more embodiments of the present disclosure. The blocks of process 100 are described herein as occurring in serial, or linearly (e.g., one after another). However, multiple blocks of process 100 may occur in parallel. In addition, the blocks of process 100 need not be performed in the order shown and/or one or more of the blocks of process 100 need not be performed. It is noted that the process 100 generally describes the user experience for setting a language and/or language dialect for the user interface 103 and several of the steps and sub-steps in the blocks of process 100 may be further described in reference to the additional figures of the present disclosure.

At block 102, a user may select an application. For example, the user may click or tap an icon of the application in a home screen or menu of the user device 101. In response to the application being selected, the application may execute (e.g., run, open, activate) on the user device 101. In some embodiments, the application may be a web application managed by a web server of a service provider. For example, a user may navigate to the web application via an internet browser at block 102 if the application is a web application. Although reference is made to a PayPal™ application in certain embodiments of the present disclosure, it will be appreciated that the application may be any application that allows a language or language dialect to be set by the user so that the user can understand communications within the user interface 103 of the application.

At block 104, the application may determine whether the user has previously selected a preferred language and/or preferred language dialect variation. For example, if the user logs into the application, the application may be able to retrieve account information or device information for the user and search a database based on the account information and/or device information to determine whether the user has previously selected a preferred language and/or preferred language dialect variation and, if so, what the preferred language and/or preferred language dialect variation is.

At block 108, if the user has previously set the preferred language and language dialect variation, then the application may retrieve the previously set preferred language and language dialect variation. At block 110, the application may apply (e.g., persist) the previously set language and language dialect variation to the text in the user interface 103 of the application.

If the application determines at block 104 that the user has not previously selected a language and/or a language dialect variation, then the application may present a language selection control 105 containing a plurality of languages to choose from as well as a dialect selection control 107 having a range of dialect variations of the selected language to choose from. In some embodiments, the dialect selection control 107 may be displayed as a sliding scale 117. In one embodiment, the sliding scale may have an informal and colloquial blend of the selected language at one end 111 and a formal and/or pure form of the selected language at an opposite end 113. In between the two ends of the sliding scale, there may be various other dialect variations of the selected language that may include various degrees of colloquialism of the selected language, terms of other languages, written script from other languages, and/or use of symbols such as emojis.

As further discussed below, a default dialect may automatically be determined and pre-selected in the sliding scale 117 for the user based on information about and related to the user. In one case, as the user slides an adjustment element 109 of the sliding scale 117 to different dialect variations, the application may display a sample text 115 of the dialect variation, thereby allowing the user to view the sample text of the different dialect variations before selecting a dialect variation. The user's selection of a preferred dialect variation in the sliding scale 117 may be saved (e.g., in the user device's 101 data storage or externally on a server database) for reference such as when the user runs the application again in the future.

Thus, the user is provided with the ability to customize the user interface 103 to have not only a preferred language but also a preferred dialect, which allows the user to better understand text and other communications in the application. As a result, the user interface 103 is more user-friendly than conventional user interfaces that are limited in how information is presented to a user through language.

To further illustrate, as shown in FIG. 1, the user may select Hindi as the language in the language selection control 105. Subsequently, the user may use the dialect selection control 107 to select a dialect by moving the adjustment element 109 of the sliding scale 117 to a position on the sliding scale 117 corresponding to a desired dialect variation. At an end 111 of the sliding scale 117, the user may have Hindi and English as an informal dialect variation option for Hindi. At the opposite end 113 of the sliding scale 117, the user may have Hindi as a formal dialect variation of Hindi. In between the informal dialect variation and the formal dialect variations of Hindi, the user may have Hinglish as a dialect variation option, which may be a combination of the informal dialect variation of Hindi and the formal dialect variation of Hindi. As the user slides between the dialect variations, the sample text 115 may adjust to provide a preview of what the user can expect if the current dialect variation in the sliding scale 117 is chosen.

Figure 2:
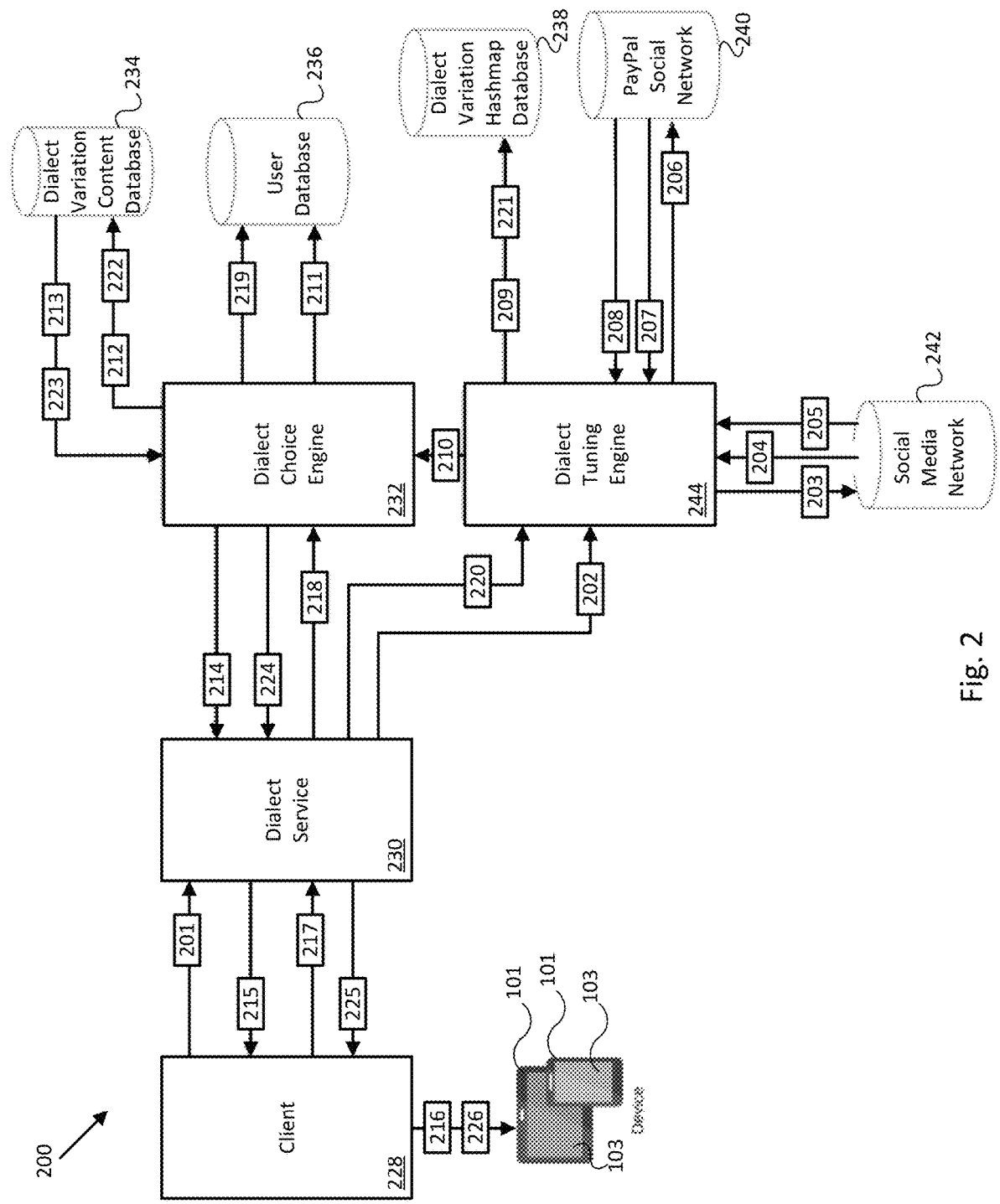
FIG. 2 illustrates a dialect service system suitable for setting a language and/or language dialect for a user interface in accordance with one or more embodiments of the present disclosure.

Referring now to FIG. 2, illustrated is a dialect service system 200 suitable for setting a language and/or language dialect for a user interface 103 of an application installed on a user device 101 in accordance with one or more embodiments of the present disclosure. It will be appreciated that several of the blocks described with reference to FIG. 2 may be applied in the process 100 of FIG. 1 according to embodiments of the present disclosure.

At block 201, a client 228 (e.g., hardware and/or software of a user device 101 configured to access a dialect service 230 made available on a remote server(s)) may send user information to the dialect service 230. The dialect service 230 may receive the user information from the client 228. The user information may include user device 101 details such as the user device's 101 model, type, brand, and whether the user device 101 is a temporary disposable phone (e.g., "burner" phone). The user device 101 details may further include an operating system of the user device 101, a size of memory and/or internal storage of the user device 101, a network provider for the user device 101, a location of the user device 101 (e.g., geo-coordinates), and a language-accept list of the user device 101 (e.g., which languages the user device 101 is set up or configured for input and/or output). The user information may also include a referring URL (e.g., a URL that directs the user to the application), a cluster state (e.g., if the user has already been assigned a cluster corresponding to a language and language dialect), a Network ID (such as a PayPal Social Network ID or other Application-specific Social Network ID), and/or a Social Media Platform ID.

In an embodiment, the user information may be sent to the dialect service 230 as part of a request (directly or indirectly) to determine a default dialect variation for the application executing on the user device 101. In an example use case, a user may have selected the application in the user device 101, and the application may require setting an initial language and/or language dialect for the text in the user interface 103 of the application. As discussed above, the application may present a plurality of language and language dialect options that the user may examine and choose from. As further discussed below, a default language and language dialect may be determined for the user and exist as a starting point in a language selection screen.

At block 202, the dialect service 230 may determine expected hash buckets for the user based on certain items in the user information received at block 201. For example, the dialect service 230 may determine hash buckets for the user based on the user device 101 details, the referring URL, and/or the cluster state. The hash buckets may correspond to the different items of the user information and may each represent a demographic or socioeconomic facet of the user. The hash buckets of the user help to determine what language and language dialect that the user will most likely want for the user interface 103 of the application.

The dialect service 230 may send the expected hash buckets to the dialect tuning engine 244 along with other items of the user information such as the PayPal Social Network ID and Social Media Platform ID. The dialect tuning engine 244 may receive the expected hash buckets and items of the user information for further tuning of the expected hash buckets and determining additional hash buckets for the user based on information gathered using the PayPal Social Network ID and Social Media Platform ID. By tuning the hash buckets and determining additional hash buckets, the dialect tuning engine 244 may create a hashmap that has a higher confidence value indicating how certain the user will use the determined default language and language dialect in the application.

At block 203, the dialect tuning engine 244 may send a request including the Social Media Platform ID to a corresponding social media network 242 to obtain social media information related to the user. In one embodiment, the dialect tuning engine 244 may have authorization to access the social media information related to the user if the user is logged into the application and the application is linked to a social media platform associated with the social media network 242. The social media information may be acquired to further determine socioeconomic details related to the user, which may assist in determining which language and language dialect would be most useful and likely to be used by the user.

In some embodiments, the social media information obtained from the social media network 242 may include locations of user activity (e.g., locations where the user has checked-in to the social media platform, locations where the user has used and/or logged into the social media platform, locations where the user has published posts on the social media platform, etc.), demographic information of the user (e.g., age, race, ethnicity, gender, marital status, income, education, and/or employment), infographic hash buckets of the user, and/or social media contacts of the user and locations of the social media contacts. Social media contacts and their locations may assist in determining socioeconomics of friends and family of the user and where friends and family are generally located may be indicative of what language and language dialect the user prefers.

The dialect tuning engine 244 may further request message streams (e.g., messages exchanged between the user and social media contacts) from the social media network to analyze and determine how the user interacts and communicates with his/her social media contacts, which may be indicative of what language and dialect that the user would prefer for the user interface 103 in the application executing on the user device 101. For example, if a large proportion of the messages exchanged between the user and his/her social media contacts are in a specific language but have certain terms written in another language, it may indicate that the user does not prefer a formal or pure dialect of the specific language but instead prefers an informal dialect with certain terms printed in a different language.

In response to the requests at block 203, the social media network 242 may send the social media information to the dialect tuning engine 244 at block 204 and may send the message streams to the dialect tuning engine 244 at block 205. In various embodiments, Application Programming Interfaces (APIs) may allow the dialect tuning engine 244 to communicate with the various other devices in the system 200 such as when requesting and receiving information from the social media network 242 at blocks 203, 204, and 205.

At block 206, the dialect tuning engine 244 may send a request to a PayPal Social Network 240 for additional user information and additional message streams. The request may include the PayPal Social Network ID for the user so that the PayPal Social Network 240 can collect the requested information corresponding to the PayPal Social Network ID. In some embodiments, the user information requested from the PayPal Social Network 240 may include demographic details (e.g., digital native, affluent, planner, established, value seeker, etc.), shopping history (e.g., fashionista, traveler, gamer, donor, etc.), income and related financial information (e.g., bank user, credit card user, debit card user, credit score, etc.), gender, age, account size (e.g., global account, enterprise account, small merchant, etc.), account details (e.g., casual seller, freelancer, large merchant, consumer, etc.), firmographics (e.g., sales volume, share of checkout), business type (e.g., consumer, merchant business-to-business, business-to-consumer, mixed, send only, etc.), seasonality (e.g., seasonal or non-seasonal), evolution details (e.g., tenure, region, country), and other account information related to the user that may be useful in analyzing a socioeconomic status of the user as a basis for determining a default language and/or language dialect of the user.

As an illustrative example, the dialect tuning engine 244 may want to know that a user is high income, female, digital native, aged 23, and a fashion shopper from New Delhi; the user transacts mostly through an Android mobile application; and one-third of the user's transactions are cross-border transactions. Such details about the user may give a helpful indication about what language and language dialect that the user would prefer.

The message streams from the PayPal Social Network 240 may include information related to messages exchanged between the user and other users such as messages exchanged in peer-to-peer transactions or merchant-to-consumer transactions. The information related to the exchanged messages may include a language and/or language dialect used in the messages and locations and preferred languages of the recipients of the messages. By collecting information about the messages and the recipients of the messages with whom the user interacts, a default language and language dialect can more accurately be predicted.

In one embodiment, if the user has logged in to an account for the PayPal Social Network 240 via another social media platform or linked the account to another social media platform such as WhatsApp™, Facebook™, Instagram™, etc., the PayPal Social Network 240 may be able to obtain additional message streams of the user on the other social media platforms as well via APIs.

At block 208, in response to the request for the user information and message streams, the PayPal Social Network 240 may send, to the dialect tuning engine 244, the requested user information and/or the message streams.

At block 209, the dialect tuning engine 244 may determine additional hash buckets for the user based on the socioeconomic data acquired at blocks 204, 205, 207, and 208. The dialect tuning engine 244 may also tune the expected hashes from dialect service 230 received at block 202 based on the socioeconomic data acquired at steps 204, 205, 207, and 208 from the Social Media Network 242 and the PayPal Social Network 240. For example, the expected hashes may be updated based on more recent data acquired from the Social Media Network 242 and the PayPal Social Network 240.

According to various embodiments, as the dialect tuning engine 244 gathers more data from users, the dialect tuning engine 244 may learn additional hash buckets that may be used to create new hashmaps that have higher confidence levels in their mapping to language dialect choices. In other words, as the dialect tuning engine 244 learns more about users, the certainty of its prediction that a user will choose a certain language dialect will increase. The hashmaps may be stored in the dialect variation hashes database 238 for future reference, such as when other users require determining a language and/or dialect for their user interface in an application.

At block 210, the dialect tuning engine 244 may determine an expected dialect choice based on a clustering algorithm such as a k-modes clustering algorithm. For example, the k-modes clustering algorithm may analyze the hash buckets representing the demographic and socioeconomic facets of the user and, based on the hash buckets, assign the user to a cluster.

In one implementation, a process for organizing clusters in a k-mode clustering algorithm begins with selecting a number (k) of clusters. A (k) number of cluster mode vectors corresponding to the (k) clusters may be selected at random (or according to accepted heuristics). For each of the cluster mode vectors, users' hashbuckets (observed data points for individuals) may be compared to the cluster mode vector's corresponding data points. For each individual's observed data point that is not equal to a corresponding data point of the cluster mode vector, a dissimilar value, calculated based on a Hamming distance (e.g., a measure of the minimum number of substitutions required to change one string into the other), may be added to the individual's score indicative of how similar that individual is to the cluster corresponding to the cluster mode vector. For any observed data point that is equal to a corresponding data point of the cluster mode vector, nothing is added to the individual's score indicative of how similar that individual is to the cluster corresponding to the cluster mode vector. The cluster corresponding to the individual's lowest score, that is, the cluster mode vector that the individual's observation data points are most similar to, may be the cluster that the individual is assigned to. Once all of the individuals have been assigned to a cluster, new cluster mode vectors may be created where each feature in the new cluster mode vector is the mode of observation data points of the individual(s) assigned to the corresponding cluster. The above process of assigning individuals to clusters then creating new clusters based on modes of the observed data points of the individuals in each cluster may be repeated until no changes are made in the assignment of individuals to the closest cluster. At this point, the cluster mode vectors have stabilized.

Once the cluster mode vectors have stabilized, the clustering algorithm can be used to assign new users to a cluster with a level of confidence. The level of confidence can be increased when more data is used to organize the clusters.

Each cluster may be mapped to a particular dialect variation. Thus, the cluster to which the user is assigned may be mapped to a particular dialect variation. The particular dialect variation may be the expected dialect choice of the user. The dialect tuning engine 244 may send the expected dialect choice to the dialect choice engine 232 at block 210.

At block 211, the dialect choice engine 232 may persist/store the expected dialect choice in a user database 236 such that when the user logs into or opens the application, the expected dialect choice may be determined by a query to the user database 236 for information about the user so that the dialect can be applied in the application.

At block 212, the dialect choice engine 232 may request sample dialect variation content corresponding to the expected dialect choice from the dialect variation content database 234. Sample dialect variation content may be a sample text for the expected dialect choice, which may allow the user to preview what the user interface 103 of the application will look like if the expected dialect choice is chosen. At block 213, the dialect choice engine 232 may receive the dialect variation content from the dialect variation content database 234.

At block 214, the dialect choice engine 232 may send the expected dialect choice to the dialect service 230. At block 215, upon receiving the dialect choice from the dialect choice engine 232, the dialect service 230 may send the expected dialect choice and sample dialect content to the client 228 for display to the user.

At block 216, in response to receiving the dialect choice and sample dialect content, the client 228 may display the dialect choice and sample content in the user device 101 as an option for the user interface 103 of the application of the user device 101. For example, the dialect choice may be displayed as a default dialect choice for the user interface 103 and the sample content may be displayed as a preview of what the user can expect for an appearance of text and communications in the user interface 103 if the default choice is chosen. In one embodiment, the default dialect choice may be displayed in the dialect selection control 107 of FIG. 1, the language corresponding to the default dialect choice may be displayed in the language selection control 105 of FIG. 1, and the sample content may be displayed as the sample text 115 of FIG. 1.

In some embodiments, as the user adjusts between dialect choices, the client 228 may send an updated dialect choice to the dialect service 230 at block 217. The dialect service 230 may send the updated dialect choice to the dialect choice engine 232 at block 218, so that the dialect choice engine 232 may store the updated dialect choice in the user database 236 at block 219.

At block 220, the dialect service 230 may send the updated dialect choice to the dialect tuning engine 244 as feedback so that the dialect tuning engine 244 may update the statistical values in its clustering algorithm based on the user's decision to use or not use the provided default dialect. At block 221, the feedback provided allows the dialect tuning engine 244 to create new hashmaps with higher statistical confidence values mapped to dialect choices. Thus, the dialect tuning engine 244 may become more accurate in predictions of dialect choices for users in the future.

At block 222, the dialect choice engine 232 may send the updated dialect choice to the dialect variation content database 234 as part of a request for a sample dialect variation corresponding to the updated dialect choice. At block 223, the dialect choice engine 232 may receive a response from the dialect variation content database 234 that has the sample dialect variation content for the updated dialect choice.

At block 224, the dialect choice engine may send the sample dialect variation content to the dialect service 230. The dialect service 230, may send the updated sample dialect content to the client 228 at block 225, which may cause the client to display the sample dialect variation as a preview for the user of the current dialect chosen on the sliding scale 117 as the sliding scale 117 is adjusted between dialect variations. At block 226, the client 228 may persist the dialect choice for the user interface 103 of the application on the user device 101 in response to a final selection by the user.

Figure 3:
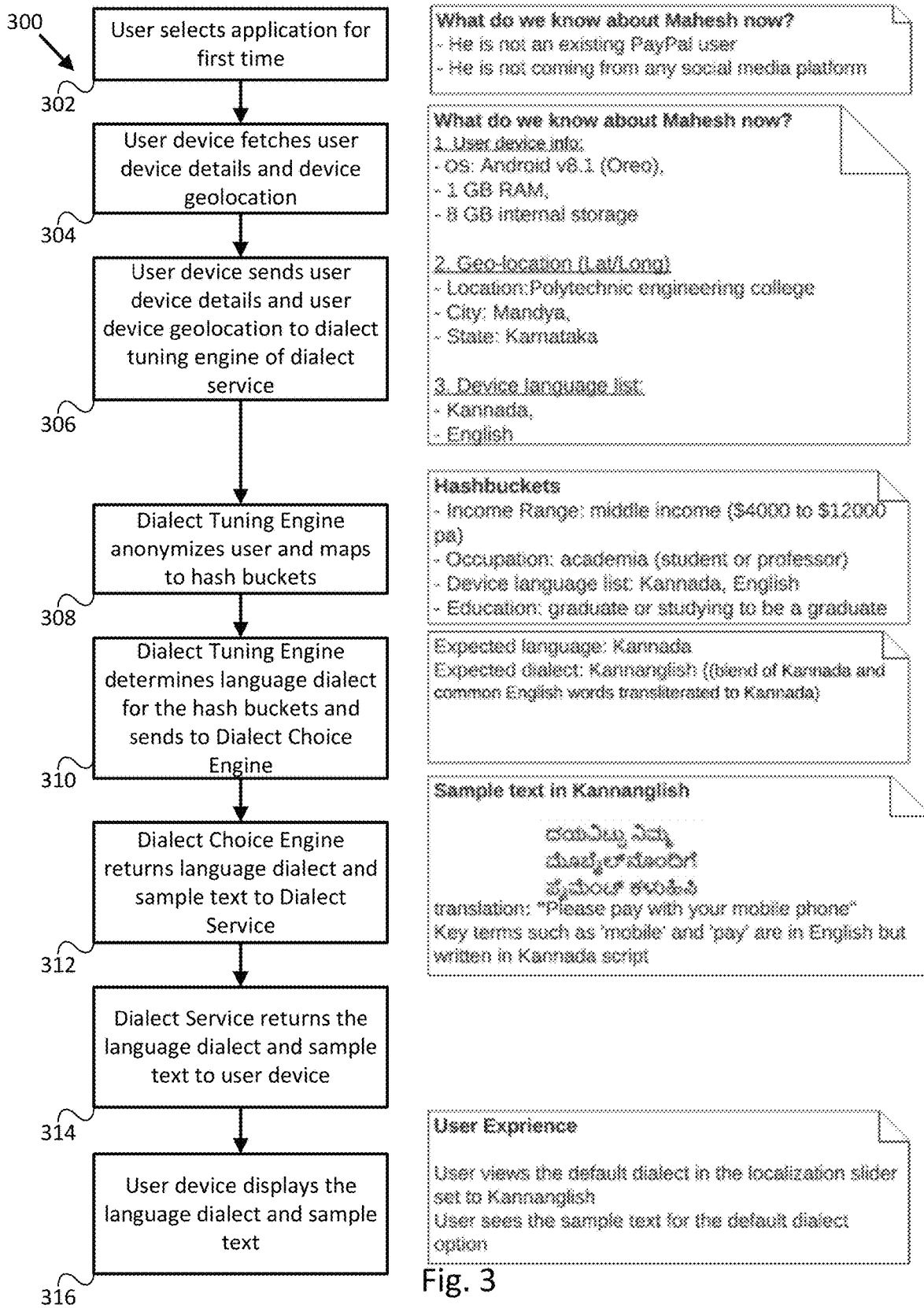
FIG. 3 illustrates is a flow diagram of an example use case for setting a language and/or language dialect for a user interface in accordance with one or more embodiments of the present disclosure.

FIG. 3 illustrates a flow diagram 300 of an example use case for setting a language and/or language dialect for a user interface 103 of a PayPal™ application installed on a user device 101 in accordance with one or more embodiments of the present disclosure. In this example use case, a user named Mahesh is a student from a small town in Mandya in the Indian state of Karnataka. Mahesh was educated completely in a less formal dialect of Kannada. Although Mahesh understands very limited English, he is forced to use digital applications in English because he finds the formal Kannada language in these digital applications to be non-conversational and bookish. The present disclosure provides a solution to Mahesh's problem by allowing Mahesh to choose a dialect variation of Kannada that merges Kannada and English into a more understandable and approachable dialect for a user interface in an application.

At block 302, the user, Mahesh, may select (e.g., open, run) the PayPal™ application for a first time. In other cases, the user may already have an existing PayPal user account or may have been redirected from a social media platform. However, in this example use case, the user does not have an existing PayPal user account and was not redirected from a social media platform.

At block 304, the user device 101 may fetch user device details and a user device geolocation to be included in user information associated with the user. In this case, the user device details include a device operating system (Android v8.1 (Oreo)), a device memory (1 GB RAM), a device storage capacity (8 GB internal storage), and device language-accept list (Kannada, English). The user device geolocation may be in the form of latitude and longitude geocoordinates. In this case, the geocoordinates are determined to correspond to Polytechnic Engineering College in the city of Mandya in the state of Karnataka.

At block 306, the user device may send the user device details and the user device geolocation to do the dialect tuning engine 244 of the dialect service 230. At block 308, the dialect tuning engine 244 may anonymize the user and map the user information into hash buckets. Anonymizing the user may include protecting private or sensitive information of the user by erasing or encrypting identifiers that connect the user to the data sent to the dialect tuning engine 244. In this case, the hash buckets for the user may be that the user's income is a middle income between $4000 to $120,000), the user's occupation is academia (student or professor), the user's device language list is Kannada and English, and the user is a college graduate or studying to be a college graduate.

At block 310, based on the hash buckets and the clustering algorithm, the dialect tuning engine 244 may assign the user to a cluster associated with a language dialect. For example, the clustering algorithm may have learned through aggregated data from a plurality of other users who have chosen language dialects in the past. Each user who chooses a language dialect may provide data points that can be used as feedback in adjusting the clustering algorithm to make it more accurate in predicting which langue and language dialect a user will choose based on their demographic and socioeconomic background. The dialect tuning engine 244 may determine that Mahesh's hash bucket profile is statistically similar (e.g., has a high confidence level) to certain profiles that chose a particular language dialect.

In this case, the determined language dialect is "Kannanglish" in which the text is in Kannada script, but certain words may translate to a common English word rather than a customary Kannada word. Once the dialect tuning engine 244 has determined the language dialect, the dialect tuning engine 244 may send the language dialect to the dialect choice engine 232 at block 310.

At block 312, the dialect choice engine 232 may return the language dialect and sample text to the dialect service 230. At block 314, the dialect service 230 may return the language dialect and sample text to the user device 101. At block 316, in response to receiving the language dialect and sample text from the dialect service 230, the user device 101 may display the language dialect, the language corresponding to the language dialect, and a preview containing the sample text of the language dialect in a language setting screen of the user interface 103 as a default choice. For example, the language setting screen may include the language selection control 105 and dialect selection control 107 of FIG. 1. In some embodiments where the dialect selection control 107 is a sliding scale, the user may have the option to adjust the sliding scale between different dialect choices for each language in the language selection control 105.

In various embodiments, the user's choice after receiving the default choice may be used as feedback for the dialect tuning engine 244 to further enhance its dialect predictions for other users. For example, if the user chooses the default language but a different dialect than the default dialect, the user's choice may be provided as feedback to improve the dialect tuning engine's 244 default dialect predictions. Further, if the user chooses a different language and language dialect altogether, the user's choice may be provided as feedback for the dialect tuning engine 244. Over time, the dialect tuning engine 244 may improve in its default dialect predictions for users as it learns from the choices of previous users, which will provide for a more user-friendly user interface for users of the PayPal™ application.

Figure 4A:
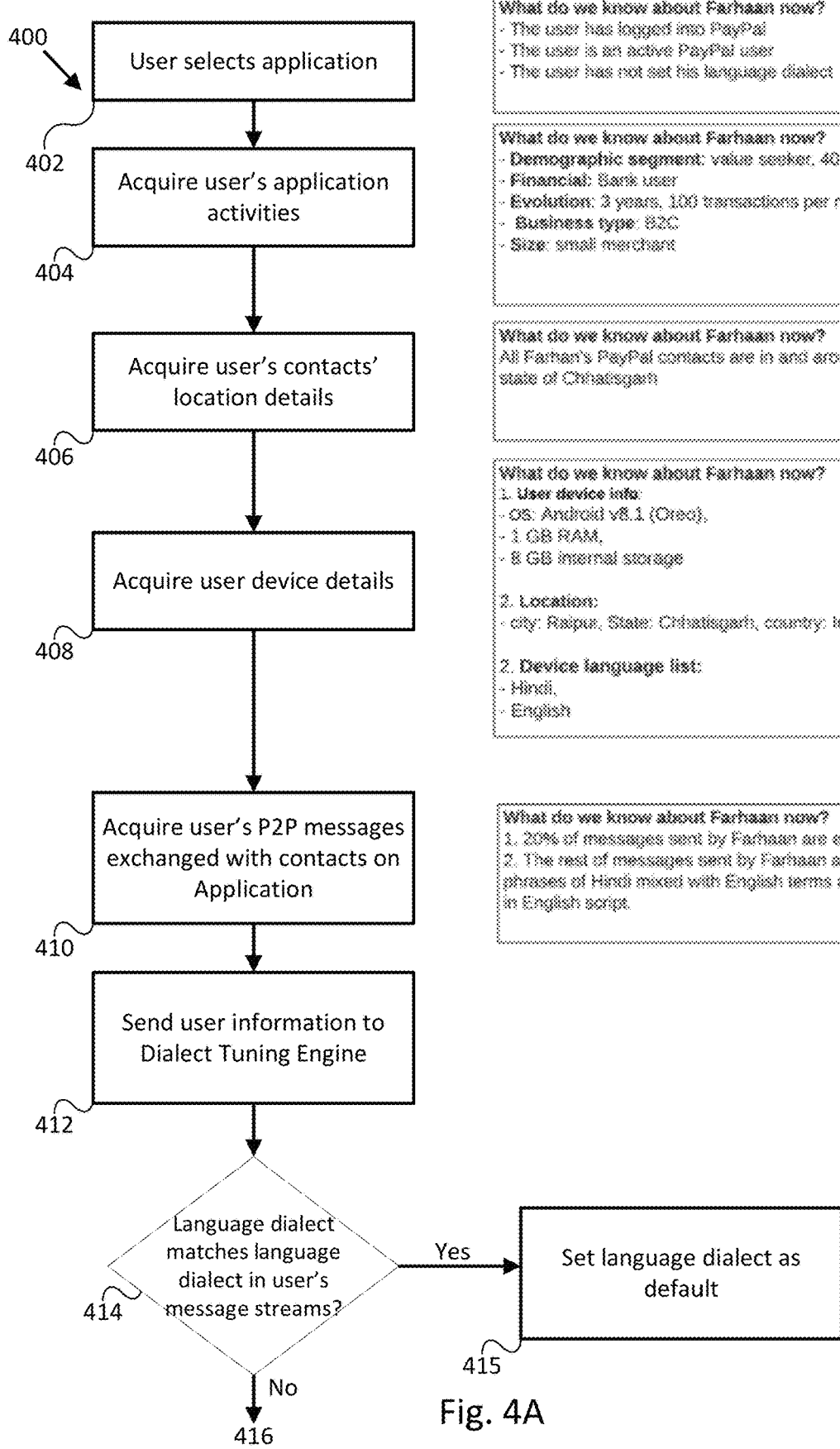
FIGS. 4A-4C illustrate a flow diagram of an example use case for setting a language and/or language dialect for a user interface in accordance with one or more embodiments of the present disclosure.
Figure 4B:
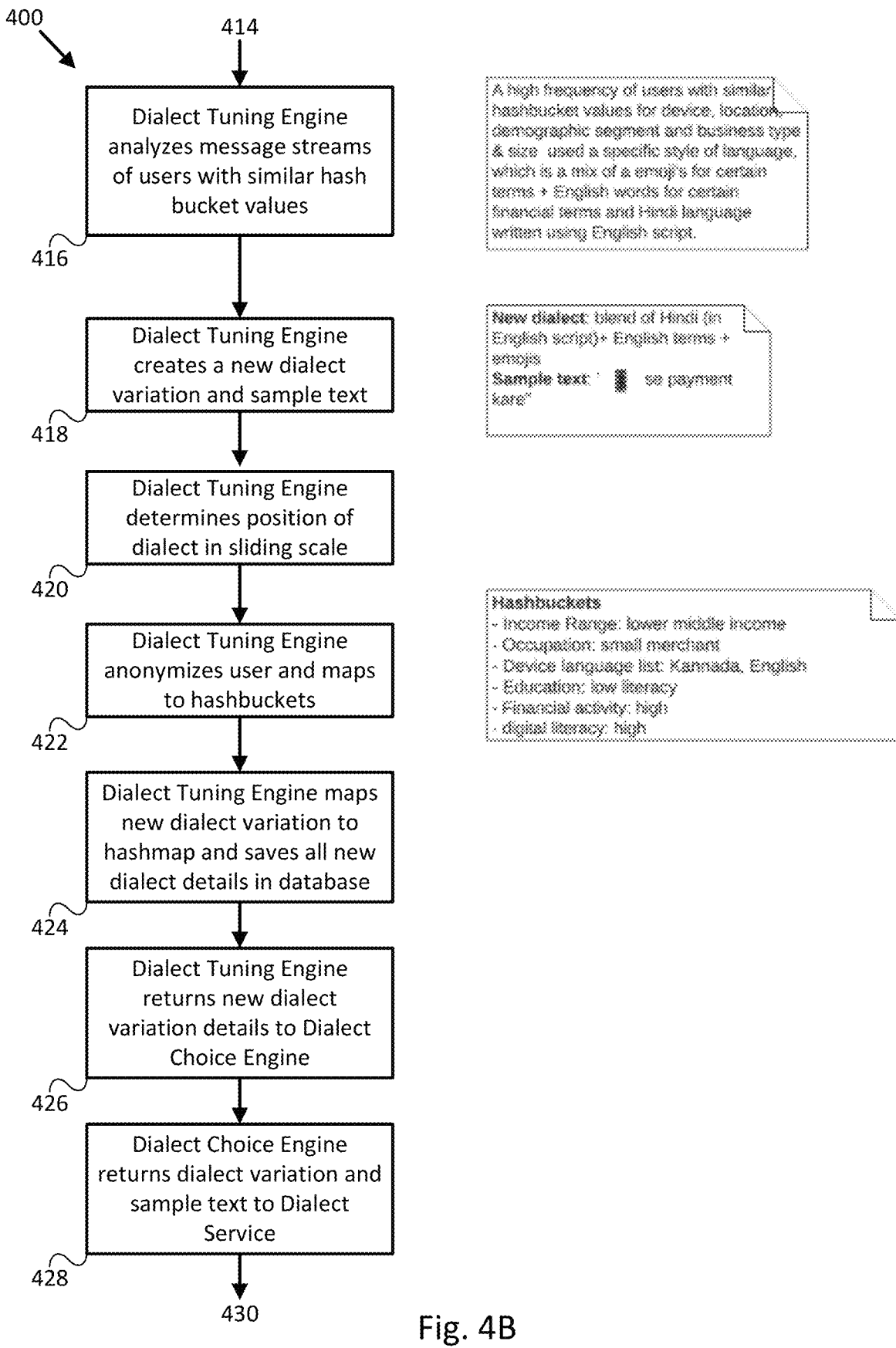
Figure 4C:
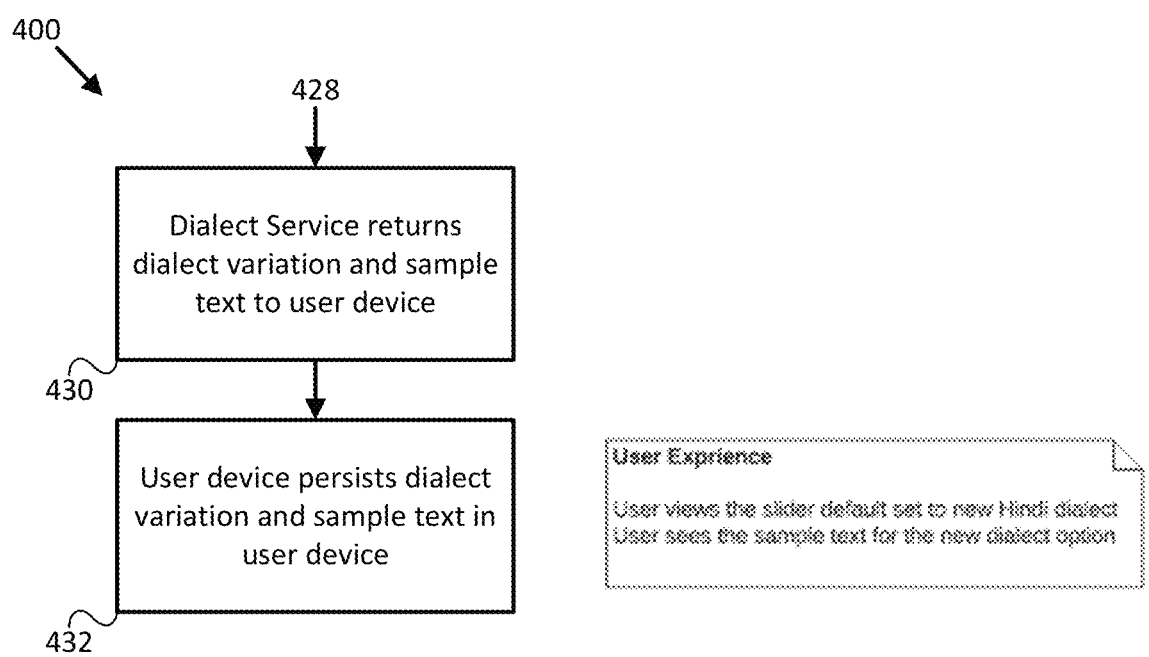

FIGS. 4A-4C illustrate a flow diagram 400 of an example use case for setting a language and/or language dialect for a user interface 103 of an application installed on a user device 101 in accordance with one or more embodiments of the present disclosure. In this example use case, a user Farhaan is a small mom and pop store owner from Raipur. Farhan studied only up to grade two, and thus cannot speak English, but he can recognize English words from experience using some digital applications. Farhan is able to operate an Automated Teller Machine (ATM) and navigate digital applications in English by using visual cues and recognizing the shape of common words like "send," "submit," "mobile," and "account." In other words, Farhan has learned certain words to operate his business.

At block 402, the user, Farhaan, may select an application such as a PayPal™ application to execute on the user device 101. In this example use case, the user already has an existing PayPal™ user account. Since the user has an existing PayPal™ account, the application may know that the user has not set a preferred language dialect for the user account yet.

At block 404, a dialect service system 200 may acquire the user's PayPal™ activities (e.g., by querying a database). In some embodiments, the user's PayPal™ activities may include transactions performed on the user's PayPal™ account. Based on the PayPal™ activities, the dialect service system 200 may determine hash buckets for the user that may represent the various demographic and socioeconomic facets of the user. For example, a hash bucket for a demographic segment for the user may be that the user is a value seeker and 40 years old. Other hash buckets may be that the user is a bank user, has performed over 100 transactions per month over three years, has a business-to-consumer type of business, and is a small merchant relative to a threshold (e.g., a number of transactions or payment volume indicating a small merchant size).

At block 406, the dialect service system 200 may acquire the user's contacts' location details. For example, the user may have contacts in the PayPal™ application with whom the user interacts. The dialect service system 200 may determine the locations (e.g., geocoordinates) of the contacts to help understand what language dialect may be relevant to the social contacts' locations and thus likely also relevant to the user. The dialect service system 200 may create additional hash buckets for the user indicative of the social contacts' locations.

At block 408, the dialect service system 200 may acquire user device details for the user's user device 101. For example, the user device details may include an operating system of the user device 101, the memory capacity for a random access memory (RAM) of the user device 101, the capacity of an internal storage of the user device 101, a location of the user device 101, and/or a device language-accept list. In one embodiment, the dialect service system 200 may acquire the device details from the user device 101.

At block 410, the dialect service system 200 may acquire the user's peer-to-peer (P2P) messages exchanged with contacts on the PayPal™ application. From the messages exchanged, the dialect service system 200 may learn that a certain percentage of the messages sent by the user contained emojis and/or a certain percentage of the messages exchanged are simply emojis. The dialect service system 200 may further learn that a certain percentage of text containing messages sent by the user are short phrases of Hindi mixed with English terms where all of the text is written in English script.

At block 412, the dialect service system 200 may send the user information acquired at blocks 404, 406, 408, and 410 to a dialect tuning engine 244 of the dialect service system 200. At block 414, the dialect tuning engine 244 may determine a language dialect based on the acquired user information at blocks 404, 406, 408, and 410. For example, as discussed herein, using the user information and based on a clustering algorithm such as a k-modes clustering algorithm, the user may be assigned to a cluster that corresponds to a particular language dialect. The dialect tuning engine 244 may evaluate whether the determined language dialect matches the language dialect used in the user's message streams. If the determined language dialect matches the language dialect used in the user's message streams, then the determined dialect language may be set as the default language dialect for the user device 101 at block 415.

At block 416, if the determined dialect language does not match the dialect language of the message streams, the dialect tuning engine 244 may analyze message streams of other users with similar hash buckets as the user Farhaan. In this case, the dialect tuning engine 244 may determine that there is a high frequency of users with similar hash buckets for device, location, demographic segment, and business type and merchant size who use a specific style of language that consists of a mix of emojis for certain terms, English words for certain financial terms, and Hindi language written in English script. This specific style of language may not have previously been defined.

At block 418, the dialect tuning engine 244 may create a new dialect variation based on the style of language used by users with similar hash buckets as the user Farhaan. For example, other small business owners with similar demographic and socioeconomic attributes as Farhan may use a combination of Hindi written in English script, English terms written in English script, and emojis.

At block 420, the dialect tuning engine 244 may determine a position for the new dialect variation in a sliding scale 117 of dialect variations such that the dialect variations are intuitive for a user to choose from. For example, the dialect variations may be arranged from informal dialect variations on one end of the sliding scale 117 to formal dialect variations on the other end of the sliding scale 117.

At block 422, the dialect tuning engine anonymizes the user and maps the user information to hash buckets so that at block 424 the dialect tuning engine may map the new dialect variation created at block 418 to the hashmap corresponding to the user. In this regard, the clustering algorithm may be updated to include the new data points for the user and create new mapping between a cluster and the new dialect variation.

At block 426, the dialect tuning engine 244 may return the new dialect variation details to the dialect choice engine 232 of the dialect service system 200. At block 428, the dialect choice engine 232 may return the new dialect variation and a sample text of the new dialect variation to the dialect service 230.

At block 430, the dialect service 230 may return the dialect variation and the sample text of the dialect variation to the user device 101. At block 432, the user device persists the new dialect variation and sample text in the user device 101. For example, when user the goes to adjust their language settings, the PayPal™ application may display the new dialect variation and sample text as the default choice for the language dialect of the user interface 103 of the PayPal™ application.

Figure 5A:
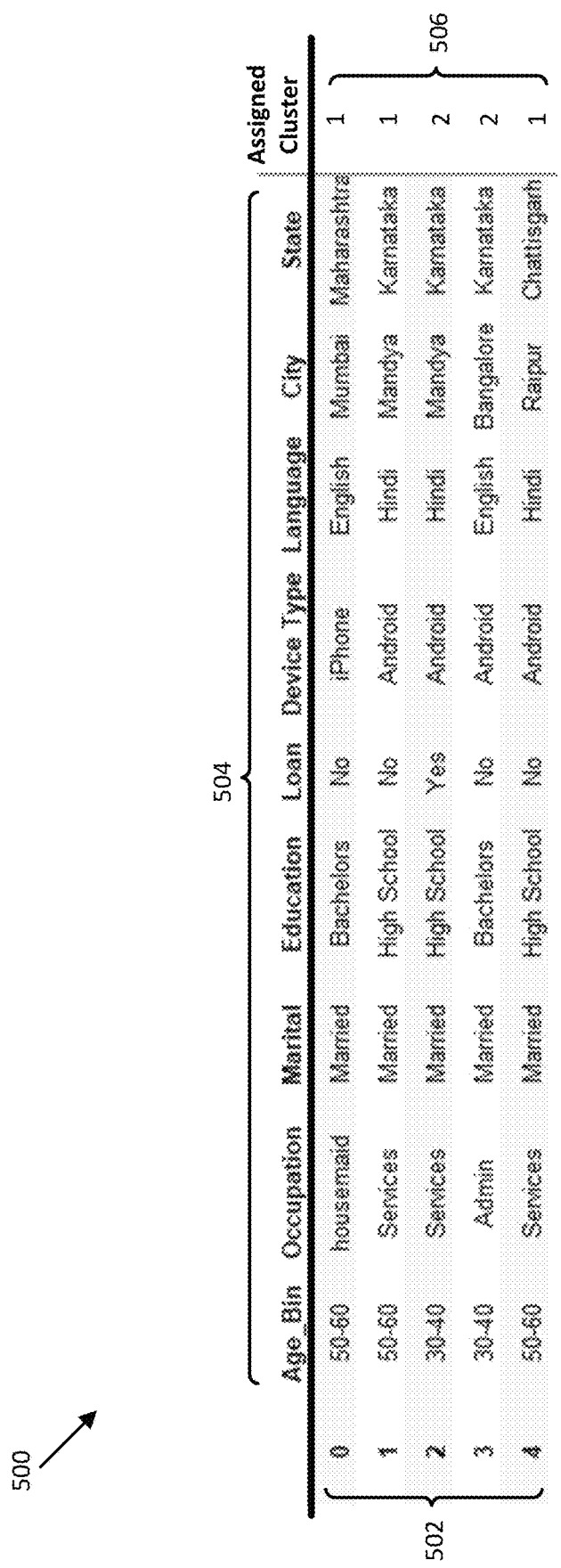
FIG. 5A illustrates a dataset of an example use case for clustering users to provide a default dialect setting for a user interface in accordance with one or more embodiments of the present disclosure.

FIG. 5A illustrates a dataset 500 of an example use case for clustering users 502 to provide a default dialect setting for the users 502. In the example use case of FIG. 5A, the users 502 may be associated with hash buckets 504 that describe their demographic and socioeconomic background. Based on the hash buckets 504, a clustering algorithm may assign each of the users 502 to one of the clusters 506. Each cluster of the clusters 506 may be mapped to a dialect variation of a language. For example, cluster "1" may be mapped to dialect variation of a language and cluster "2" may be mapped to a different dialect variation of the language. A default dialect variation for each of the users 502 may be determined based on the cluster to which the user is assigned.

FIG. 5B illustrates examples 501 of language and language dialect variations. In Example 1, Hindi has four language dialect variations. Each language dialect may be presented to a user to choose from when setting a language and language dialect for a user interface 103. In Example, 2, Spanish has three language dialect variations that can be presented to a user to choose from when setting a language and language dialect for a user interface 103. As shown in the examples 501, dialect variations may be a combination of different languages, language styles, symbols (e.g., emojis), and written scripts.

Figure 6:
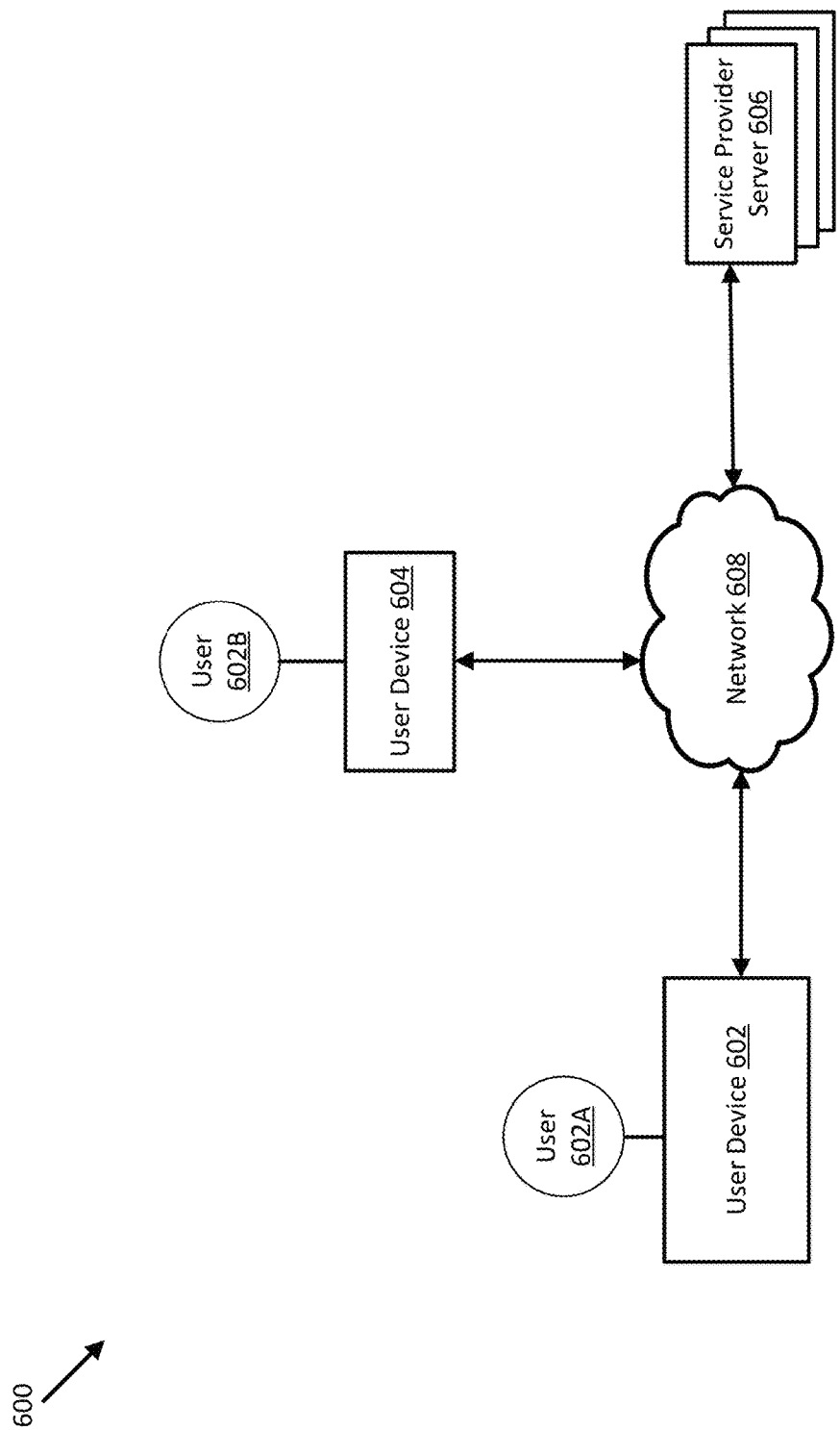
FIG. 6 illustrates a block diagram of a networked system suitable for implementing one or more embodiments of the present disclosure.

Referring now to FIG. 6, a block diagram of a networked system 600 configured to provide language and language dialect services in accordance with one or more embodiments of the present disclosure is illustrated. System 600 includes user devices 602 and 604 and service provider server(s) 606. A user 602A is associated with user device 602, where user 602A can provide an input to service provider server 606 using user device 602.

User device 602 and service provider server 606 may each include one or more processors, memories, and other appropriate components for executing instructions such as program code and/or data stored on one or more computer-readable mediums to implement the various applications, data, and steps described herein. For example, such instructions may be stored in one or more computer-readable media such as memories or data storage devices internal and/or external to various components of system 600, and/or accessible over a network 608 at each of the blocks of FIG. 2. Each of the memories may be non-transitory memory. Network 608 may be implemented as a single network or a combination of multiple networks. For example, in various embodiments, network 608 may include the Internet or one or more intranets, landline networks, and/or other appropriate types of networks.

User device 602 may be implemented using any appropriate hardware and software configured for wired and/or wireless communication over network 608. For example, in some embodiments, user device 602 may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 602 may include one or more browser applications which may enable the user device 602 to various web applications provided by service provider server(s) 606 over network 608. User device 602 may also include one or more toolbar applications which may be used, for example, to provide client-side processing for performing desired tasks in response to operations selected by user 602A. In one embodiment, the toolbar application may display a user interface in connection with the browser application.

User device 602 may further include other applications as may be desired in particular embodiments to provide desired features to user device 602. For example, the other applications may include an application to interface between service provider server 606 and the network 608, security applications for implementing client-side security features, programming client applications for interfacing with appropriate application programming interfaces (APIs) over network 608, or other types of applications. In some cases, the APIs may correspond to service provider server 606. The applications may also include email, texting, voice, and instant messaging applications that allow user 602A to send and receive emails, calls, and texts through network 608, as well as applications that enable the user to communicate to service provider server 606 as discussed above. User device 602 includes one or more device identifiers which may be implemented, for example, as operating system registry entries, cookies associated with the browser application, identifiers associated with hardware of user device 602, or other appropriate identifiers, such as those used for user, payment, device location, and or authentication. In some embodiments, a device identifier may be used by service provider server 606 to associate user 602A with a particular account maintained by the service provider server 606. A communications application with associated interfaces facilitates communication between user device 602 and other components within system 600. User device 604 may be similar to user device 602.

Service provider server 606 may be maintained, for example, by an online service provider which may provide language dialect services as discussed herein. In this regard, service provider server 606 includes one or more applications which may be configured to interact with user device 602 and user device 604 over network 608 to facilitate the provision of language dialects as discussed in the present disclosure. Service provider server 606 maintains a plurality of user accounts (e.g., stored in a user account database accessible by service provider server 606), each of which may include account information associated with individual users such as preferred languages and language dialects.

Figure 7:
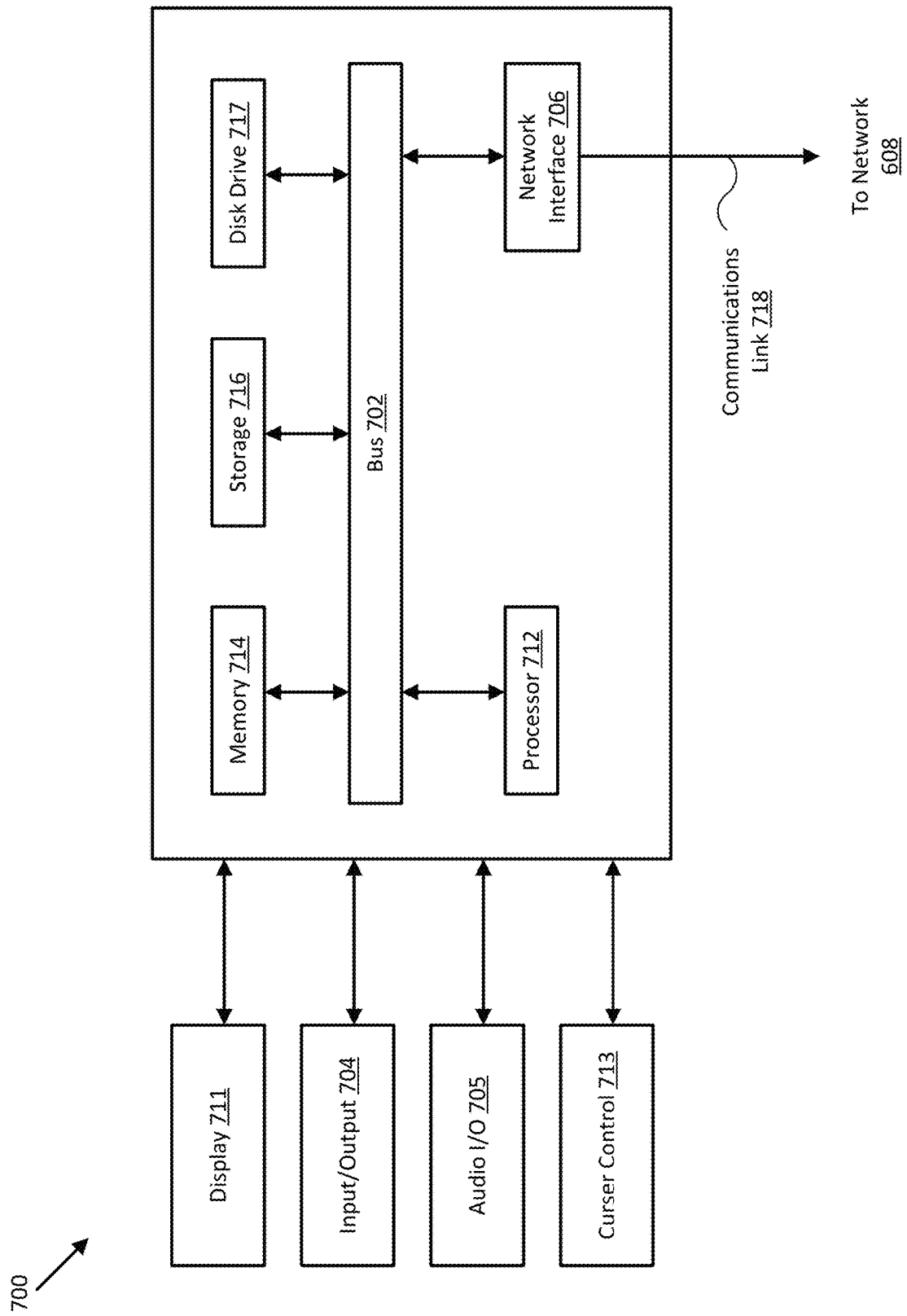
FIG. 7 illustrates a block diagram of a computer system in accordance with one or more embodiments of the present disclosure.

FIG. 7 illustrates a block diagram of a computer system 700 suitable for implementing one or more embodiments of the present disclosure. In various implementations, the computer system 700 may comprise a personal computing device (e.g., a personal computer, laptop, smart phone, PDA, Bluetooth device, key FOB, badge, wearable device such as a smart watch, smart TV, or any other visual accessibility capable device) and/or a server computing device. It should be appreciated that each of the devices utilized by users and service providers discussed herein may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component, such as a display 711 and a cursor control 713 (such as a keyboard, keypad, mouse, etc.). I/O component 704 may further include NFC communication capabilities. An optional audio I/O component 705 may also be included to allow a user to use voice for inputting information by converting audio signals. Audio I/O component 705 may allow the user to hear audio such as audible descriptions provided by a screen reader application. A transceiver or network interface 706 transmits and receives signals between computer system 700 and other devices, such as another user device, an entity server, and/or a provider server via network 608. In one embodiment, the transmission is wireless, although other transmission mediums and methods may also be suitable. Processor 712, which may be one or more hardware processors, can be a micro-controller, digital signal processor (DSP), or other processing component, processes these various signals, such as for display on computer system 700 or transmission to other devices via a communication link 718. Processor 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714. Logic may be encoded in a computer-readable medium, which may refer to any medium that participates in providing instructions to processor 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network 608 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:
1. A system, comprising:
a non-transitory memory; and
one or more hardware processors coupled to the non-transitory memory and configured to read instructions from the non-transitory memory to cause the system to perform operations comprising:
  receiving, via a network, a request to determine a default dialect for an application on a user device, the request including one or more identifiers associated with the user device;
  acquiring, via the network, user information corresponding to a user of the user device, based on the one or more identifiers included in the received request;
  based on the user information and using a clustering algorithm, assigning the user to a cluster associated with a dialect;
  providing, via the network to the user device, the dialect for display as the default dialect in a sliding scale of selectable dialects in a user interface of the application on the user device;
  receiving, via the user interface of the application, an input from the user selecting a preferred dialect from among the selectable dialects indicated by a movement of an adjustment element of the sliding scale to a position on the sliding scale corresponding to the preferred dialect; and updating the default dialect for the application to the preferred dialect selected by the user.

2. The system of claim 1, wherein the operations further comprise:
recording, in a database, the preferred dialect selected by the user and the user information as feedback for the clustering algorithm.

3. The system of claim 2, wherein:
the preferred dialect is not the default dialect; and
the operations further comprise:
monitoring user activity within the application;
based on the monitored activity, generating a new dialect;
integrating the new dialect and the user information into the clustering algorithm; and
determining a new default dialect for another user after the integrating.

4. The system of claim 1, wherein the dialect comprises a merger between two or more languages of the user device.

5. The system of claim 1, wherein the dialect comprises a merger between one or more languages and emojis of the user device.

6. The system of claim 1, wherein:
the user information comprises social media information; and
the operations further comprise:
obtaining a social media identifier and a social media authorization from the user device;
requesting the social media information from a social media network by using the social media identifier and the social media authorization; and
receiving the social media information from the social media network.

7. The system of claim 1, wherein:
the application comprises a payment transaction application; and
the user information comprises archived payment transaction information.

8. The system of claim 1, wherein:
the user information comprises user device information corresponding to the user device; and
the user device information comprises one or more of a type of operating system of the user device, a size of memory and/or internal storage of the user device, a geolocation of the user device, or a user device accept-language list.

9. The system of claim 1, wherein:
the user information comprises at least one message exchanged between the user and another user in the application; and
the operations further comprise:
determining whether a database-stored dialect matches a dialect contained in the at least one message; and
in response to determining that the database-stored dialect matches the dialect contained in the at least one message, displaying the dialect contained in the at least one message as the default dialect for the application in the user interface.

10. A computer-implemented method comprising:
receiving, by a server via a network, a request to determine a default dialect for an application on a user device, the request including one or more identifiers associated with the user device;
acquiring, by the server via the network, user information corresponding to a user of the user device, based on the one or more identifiers included in the received request;
assigning the user to a cluster associated with a dialect, based on the user information and a clustering algorithm;
providing, via the network to the user device, the dialect for display as the default dialect in a sliding scale of selectable dialects in a user interface of the application on the user device;
receiving, via the user interface of the application, an input from the user selecting a preferred dialect from among the selectable dialects indicated by a movement of an adjustment element of the sliding scale to a position on the sliding scale corresponding to the preferred dialect; and
updating the default dialect for the application to the preferred dialect selected by the user.

11. The method of claim 10, further comprising:
recording, in a database, the preferred dialect selected by the user and the user information as feedback for the clustering algorithm.

12. The method of claim 11, wherein:
the preferred dialect is not the default dialect; and
the method further comprises:
monitoring user activity within the application;
based on the monitored activity, generating a new dialect;
integrating the new dialect and the user information into the clustering algorithm; and
determining a new default dialect for another user after the integrating.

13. The method of claim 10, wherein the dialect comprises a merger between two or more languages of the user device.

14. The method of claim 10, wherein the dialect comprises a merger between one or more languages and emojis of the user device.

15. The method of claim 10, wherein:
the user information comprises social media information; and
the method further comprises:
obtaining a social media identifier and a social media authorization from the user device;
requesting the social media information from a social media network by using the social media identifier and the social media authorization; and
receiving the social media information from the social media network.

16. The method of claim 10, wherein:
the application comprises a payment transaction application; and
the user information comprises archived payment transaction information.

17. The method of claim 10, wherein:
the user information comprises user device information corresponding to the user device; and
the user device information comprises one or more of a type of operating system of the user device, a size of memory and/or internal storage of the user device, a geolocation of the user device, or a user device accept-language list.

18. The method of claim 10, wherein:
the user information comprises at least one message exchanged between the user and another user in the application; and
the method further comprises:
determining whether a database-stored dialect matches a dialect contained in the at least one message; and in response to determining that the database-stored dialect matches the dialect contained in the at least one message, displaying the dialect contained in the at least one message as the default dialect for the application in the user interface.

19. A non-transitory machine-readable medium having stored thereon machine-readable instructions executable to cause a machine to perform operations comprising:
    receiving, via a network, a request to determine a default dialect for an application on a user device, the request including one or more identifiers associated with the user device;
    acquiring, via the network, user information corresponding to a user of the user device, based on the one or more identifiers included in the received request;
    assigning the user to a cluster associated with a dialect, based on the user information and a clustering algorithm;
    providing, via the network to the user device, the dialect for display as the default dialect in a sliding scale of selectable dialects in a user interface of the application on the user device;
    receiving, via the user interface of the application, an input from the user selecting a preferred dialect from among the selectable dialects indicated by a movement of an adjustment element of the sliding scale to a position on the sliding scale corresponding to the preferred dialect; and
    updating the default dialect for the application to the preferred dialect selected by the user.

20. The non-transitory machine-readable medium of claim 19, wherein the operations further comprise:
    determining that the default dialect has not been selected as the preferred dialect for the application;
    monitoring user activity within the application;
    based on the monitored activity, adjusting the default dialect to include one or more new words;
    integrating the adjusted dialect and the user activity into the clustering algorithm; and
    providing the adjusted dialect as a default dialect for another user device.

\* \* \* \* \*